(12) United States Patent
Amini et al.

(10) Patent No.: US 11,181,383 B2
(45) Date of Patent: Nov. 23, 2021

(54) SYSTEMS AND METHODS FOR VEHICULAR NAVIGATION AND LOCALIZATION

(71) Applicants: Toyota Research Institute, Inc., Los Altos, CA (US); Massachusetts Institute of Technology, Cambridge, MA (US)

(72) Inventors: Alexander Amini, Cambridge, MA (US); Guy Rosman, Newton, MA (US); Sertac Karaman, Cambridge, MA (US); Daniela Rus, Weston, MA (US)

(73) Assignees: Toyota Research Institute, Inc., Los Altos, CA (US); Massachusetts Institute of Technology, Cambridge, MA (US)

( * ) Notice: Subject to any disclaimer, the term of this patent is extended or adjusted under 35 U.S.C. 154(b) by 300 days.

(21) Appl. No.: 16/406,809

(22) Filed: May 8, 2019

(65) Prior Publication Data

US 2020/0088525 A1    Mar. 19, 2020

Related U.S. Application Data

(60) Provisional application No. 62/731,896, filed on Sep. 15, 2018.

(51) Int. Cl.
*B60W 10/20* (2006.01)
*B60W 40/10* (2012.01)
(Continued)

(52) U.S. Cl.
CPC ............. *G01C 21/28* (2013.01); *B60W 10/04* (2013.01); *B60W 10/18* (2013.01); *B60W 10/20* (2013.01);
(Continued)

(58) Field of Classification Search
CPC ....... G01C 21/28; G01C 21/30; B60W 10/20; B60W 2420/52; B60W 2420/42;
(Continued)

(56) References Cited

U.S. PATENT DOCUMENTS

| 9,946,260 B2 | 4/2018 | Shashua et al. | |
| 2018/0299557 A1* | 10/2018 | Yi | ............................ G01S 17/89 |
| 2020/0055515 A1* | 2/2020 | Herman | .................. H04W 4/46 |

OTHER PUBLICATIONS

Seff et al., "Learning from Maps: Visual Common Sense for Autonomous Driving," Princeton University and AutoX, Dec. 7, 2016, found at https://arxiv.org/pdf/1611.08583.pdf.
(Continued)

*Primary Examiner* — Genna M Mott
(74) *Attorney, Agent, or Firm* — Christopher G. Darrow; Darrow Mustafa PC

(57) ABSTRACT

Systems and methods described herein relate to vehicular navigation and localization. One embodiment extracts perceptual features from sensor data; extracts unrouted-map features from unrouted map data; combines the perceptual features and the unrouted-map features to produce first combined features data; outputs, based at least in part on the first combined features data, parameters of a probability distribution for one or more steering trajectories that are available to a vehicle; and performs a localization of the vehicle based, at least in part, on the parameters of the probability distribution.

13 Claims, 9 Drawing Sheets

(51) Int. Cl.
| | |
|---|---|
| G01C 21/28 | (2006.01) |
| B60W 10/18 | (2012.01) |
| B60W 10/04 | (2006.01) |
| B60W 30/18 | (2012.01) |

(52) U.S. Cl.
CPC ............ *B60W 30/18* (2013.01); *B60W 40/10* (2013.01); *B60W 2400/00* (2013.01); *B60W 2420/42* (2013.01); *B60W 2420/52* (2013.01); *B60W 2420/54* (2013.01); *B60W 2710/18* (2013.01); *B60W 2710/20* (2013.01); *B60W 2720/106* (2013.01)

(58) Field of Classification Search
CPC ......... B60W 2420/54; B60W 2710/20; B60W 2400/00; B60W 60/0011; B60W 40/10
See application file for complete search history.

(56) References Cited

OTHER PUBLICATIONS

Hecker et al., "End-to-End Learning of Driving Models with Surround-View Cameras and Route Planners," ECCV 2018, computer Vision Foundation, Sep. 2018, found at http://openaccess.thecvf.com/content_ECCV_2018/papers/Simon_Hecker_Learning_to_Drive_ECCV_2018_paper.pdf.

Brahmbhatt et al., "MapNet: Geometry-Aware Learning of Maps for Camera Localization," Georgia Institute of Technology and NVIDIA, Dec. 9, 2017, found at http://openaccess.thecvf.com/content_ECCV_2018/papers/Simon_Hecker_Learning_to_Drive_ECCV_2018_paper.pdf.

Xu et al., "End-to-end Learning of Driving Models from Large-scale Video Datasets," CPVR, University of California, Berkeley, 2017, found at http://openaccess.thecvf.com/content_cvpr_2017/papers/Xu_End-To-End_Learning_of_CVPR_2017_paper.pdf.

Amini et al., "Variational Autoencoder for End-to-End Control of Autonomous Driving with Novelty Detection and Training Debiasing," TRI and MIT, 2018 IEEE/RSJ International Conference on Intelligent Robots and Systems (IROS), found at http://people.csail.mit.edu/rosman/papers/iros-2018-variational.pdf.

Amini, "Robust End-to-End Learning for Autonomous Vehicles," Master's Thesis at MIT, Jun. 2018, found at https://dspace.mit.edu/bitstream/handle/1721.1/118031/1051458698-MIT.pdf?sequence=1.

Sutton et al., "Between mdps and semi-mdps: A framework for temporal abstraction in reinforcement learning," Artificial Intelligence, vol. 112, No. 1-2, pp. 181-211, 1999.

Codevilla et al., "End-to-end driving via conditional imitation learning," arXiv preprint arXiv:1710.02410, 2017.

Shalev-Shwartz et al., "Safe, multi-agent, reinforcement learning for autonomous driving," arXiv preprint arXiv:1610.03295, 2016.

Gao et al., "Intention-net: Integrating planning and deep learning for goal-directed autonomous navigation," arXiv preprint arXiv:1710.05627, 2017.

Leonard et al., "Simultaneous map building and localization for an autonomous mobile robot," in Intelligent Robots and Systems' 91. 'Intelligence for Mechanical Systems, Proceedings IROS'91. IEEE/RSJ International Workshop on. Ieee, 1991, pp. 1442-1447.

Montemerlo et al. "FastSLAM: A factored solution to the simultaneous localization and mapping problem," AAAI, vol. 593598, 2002.

Davison et al., "MonoSLAM: Real-time single camera SLAM," IEEE Transactions on Pattern Analysis & Machine Intelligence, No. 6, pp. 1052-1067, 2007.

Karaman et al., "Anytime motion planning using the rrt," Shanghai, China, May 2011, pp. 1478-1483.

Schwarting et al., "Safe nonlinear trajectory generation for parallel autonomy with a dynamic vehicle model," IEEE Transactions on Intelligent Transportation Systems, No. 99, pp. 1-15, 2017.

Falcone et al., "Predictive active steering control for autonomous vehicle systems," IEEE Transactions on control systems technology, 2007.

Pomerleau, et al., "ALVINN: An autonomous land vehicle in a neural network," in Advances in neural information processing systems, 1989, pp. 305-313.

Bojarski et al., "End to end learning for self-driving cars," arXiv preprint arXiv:1604.07316, 2016.

Fox et al. "Multi-level discovery of deep options," arXiv preprint arXiv:1703.08294, 2017.

Tamar et al. "Value iteration networks," in Advances in Neural Information Processing Systems, 2016, pp. 2154-2162.

Oh et al., "Value prediction network," in Advances in Neural Information Processing Systems, 2017, pp. 6118-6128.

Engel et al., "LSD-SLAM: Large-scale direct monocular SLAM," in European Conference on Computer Vision. Springer, 2014, pp. 834-849.

Paul et al., "Fab-map 3d: Topological mapping with spatial and visual appearance," in Robotics and Automation (ICRA), 2010 IEEE International Conference on. IEEE, 2010, pp. 2649-2656.

Sattler et al., "Fast image-based localization using direct 2d-to-3d matching," in Computer Vision (ICCV), 2011 IEEE International Conference on. IEEE, 2011, pp. 667-674.

Schonberger et al., "Semantic visual localization," ISPRS Journal of Photogrammetry and Remote Sensing (JPRS), 2018.

Bowman et al., "Probabilistic data association for semantic SLAM," in Robotics and Automation (ICRA), 2017 IEEE International Conference on. IEEE, 2017, pp. 1722-1729.

Bernstein et al., "An introduction to map matching for personal navigation assistants," Tech. Rep., 1998.

Newson et al., "Hidden Markov map matching through noise and sparseness," in Proceedings of the 17th ACM SIGSPATIAL international conference on advances in geographic information systems. ACM, 2009, pp. 336-343.

Naser et al., "A parallel autonomy research platform," in IEEE Intelligent Vehicles Symposium (IV), Jun. 2017.

Vydhyanathan et al. "The next generation xsens motion trackers for industrial applications," Xsens, white paper, Tech. Rep., 2018.

NVIDIA Drive 5.0 Linux SDK Development Guide, 5.0.5.0 Release, found at: https://docs.nvidia.com/drive/nvvibdocs/index.html (2017).

Marr et al., "Directional selectivity and its use in early visual processing," Proc. R. Soc. Lond. B, vol. 211, No. 1183, pp. 151-180, 1981.

LaValle et al., "Rapidly-exploring random trees: Progress and prospects," in Algorithmic and Computational Robotics: New Directions, 2000.

Kavraki et al., "Probabilistic roadmaps for path planning in high-dimensional configuration spaces", IEEE Transactions on Robotics and Automation, vol. 12, No. 4, Aug. 1996.

Leopard Imaging Inc., "LI-AR0231-GMSL-xxxH leopard imaging inc data sheet," 2018.

Oxford Technical Solutions, "OXTS RT GNSS-Aided Intertial Measurement Systems user manual", 2018.

* cited by examiner

SYSTEMS AND METHODS FOR VEHICULAR NAVIGATION AND LOCALIZATION

CROSS-REFERENCE TO RELATED APPLICATION

This application claims the benefit of U.S. Provisional Patent Application No. 62/731,896, "Variational End-to-End Navigation and Localization," filed Sep. 15, 2018, which is incorporated by reference herein in its entirety.

STATEMENT REGARDING FEDERALLY SPONSORED RESEARCH OR DEVELOPMENT

This invention was made with government support under GRFP Primary Grant No. 1122374 awarded by the National Science Foundation (NSF). The government has certain rights in the invention.

TECHNICAL FIELD

The subject matter described herein relates in general to vehicles and, more specifically, to systems and methods for vehicular navigation and localization.

BACKGROUND

Some autonomous vehicles can receive raw sensor data such as camera images as input and directly produce control signals to steer the vehicle in accordance with a specified route. Such a system can also be used to predict a driver's steering actions, where a vehicle's steering is at least partially controlled by a human driver. Current systems do not adequately account for uncertainty due to, for example, imperfect sensor data and/or inaccurate map data.

SUMMARY

An example of a system for vehicular navigation and localization is presented herein. The system comprises one or more sensors to output sensor data, one or more processors, and a memory communicably coupled to the one or more processors. The memory stores a computation module including instructions that when executed by the one or more processors cause the one or more processors to extract perceptual features from the sensor data. The computation module also includes instructions to extract unrouted-map features from unrouted map data. The computation module also includes instructions to combine the perceptual features and the unrouted-map features to produce first combined features data. The computation module also includes instructions to output, based at least in part on the first combined features data, parameters of a probability distribution for one or more steering trajectories that are available to a vehicle. The memory also stores a localization module including instructions that when executed by the one or more processors cause the one or more processors to perform a localization of the vehicle based, at least in part, on the parameters of the probability distribution.

Another embodiment is a non-transitory computer-readable medium for vehicular navigation and localization and storing instructions that when executed by one or more processors cause the one or more processors to extract perceptual features from sensor data. The instructions also cause the one or more processors to extract unrouted-map features from unrouted map data. The instructions also cause the one or more processors to combine the perceptual features and the unrouted-map features to produce first combined features data. The instructions also cause the one or more processors to output, based at least in part on the first combined features data, parameters of a probability distribution for one or more steering trajectories that are available to a vehicle. The instructions also cause the one or more processors to perform a localization of the vehicle based, at least in part, on the parameters of the probability distribution.

Another embodiment is a method of vehicular navigation and localization, the method comprising extracting perceptual features from sensor data; extracting unrouted-map features from unrouted map data; combining the perceptual features and the unrouted-map features to produce first combined features data; outputting, based at least in part on the first combined features data, parameters of a probability distribution for one or more steering trajectories that are available to a vehicle; and performing a localization of the vehicle based, at least in part, on the parameters of the probability distribution.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Human drivers have an innate ability to reason about the high-level structure of their driving environment even under severely limited observation. They use this ability to relate high-level driving instructions to concrete control commands, as well as to better localize themselves, given inaccurate location information. The embodiments described herein provide a learning engine that mimics this ability by enabling an autonomous or semi-autonomous vehicle to learn how to use map data within an end-to-end autonomous driving system.

One embodiment extracts perceptual features from sensor data and extracts unrouted-map features from unrouted map data. Based at least in part on a combination of those extracted features, the system can output the parameters of a probability distribution for one or more steering trajectories that are available to a vehicle at a given instant in time. The vehicle can be an ego vehicle in which an embodiment of the invention is installed, or the vehicle can be a road agent (e.g., another vehicle) external to an ego vehicle. The trajectory of an ego vehicle or an external road agent can be predicted based, at least in part, on the parameters of the probability distribution. One or more vehicle systems of an ego vehicle can be controlled in response to the predicted trajectory of the ego vehicle or an external road agent. In some embodiments, if a routed version of the same map data is also provided as input, the system can combine features extracted from the routed map data with the other extracted features (from the sensor data and the unrouted map data) to output a deterministic steering control signal to drive an ego vehicle autonomously in accordance with the specified route. In some embodiments, the features are extracted from the sensor data, unrouted map data, and routed map data using one or more variational neural networks. Such a configuration may be termed "end-to-end deep learning."

The embodiments described herein can also perform vehicle localization (i.e., determine where the vehicle is in the surrounding environment). In some embodiments, this localization is fine-grained. That is, the output parameters of the probability distribution can be used to more accurately determine a vehicle's location in the surrounding environment. One advantage of at least some of the embodiments described herein is that the system can detect when the map data or localization is in error and, in some cases, correct the vehicle's estimated pose. In other embodiments, the system can perform coarse-grained localization. That is, the system can distinguish among significantly different locations without any prior information regarding the vehicle's pose. This mimics the ability of a human driver to infer his or her location even if the road's appearance is quite different from what was expected or the area is unknown to the driver.

Figure 1:
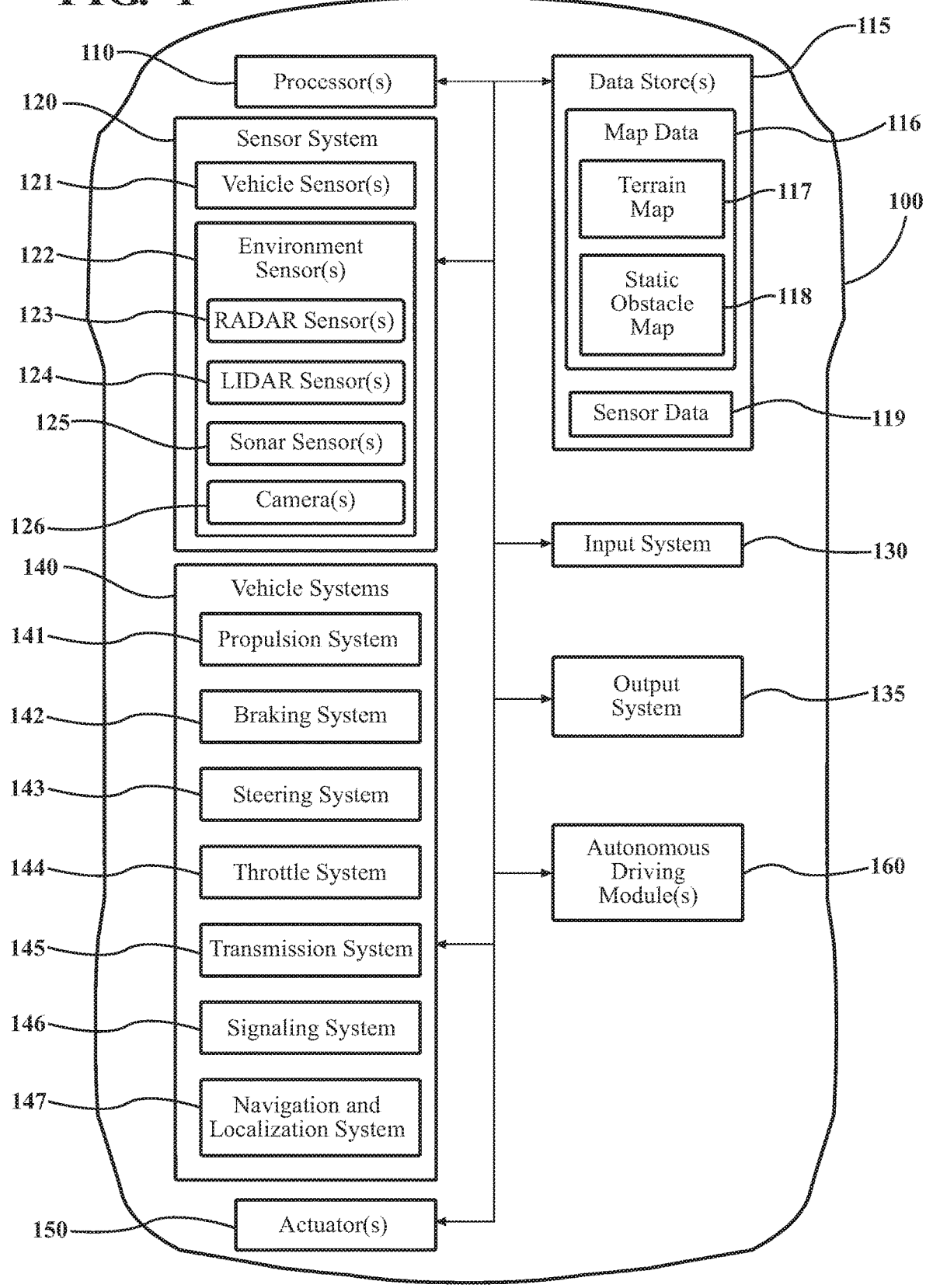
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously. As discussed further below, in some embodiments, vehicle 100 is capable of highly or fully autonomous driving. In other embodiments, vehicle 100 is a parallel-autonomy vehicle whose control (steering, braking, acceleration, etc.) is shared between a human driver and autonomous driving module(s) 160 or an advanced driver-assistance system (ADAS) (not shown in FIG. 1).

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a navigation and localization system 147 that is implemented to perform methods and other functions as disclosed herein relating to vehicular navigation and localization.

Figure 2:
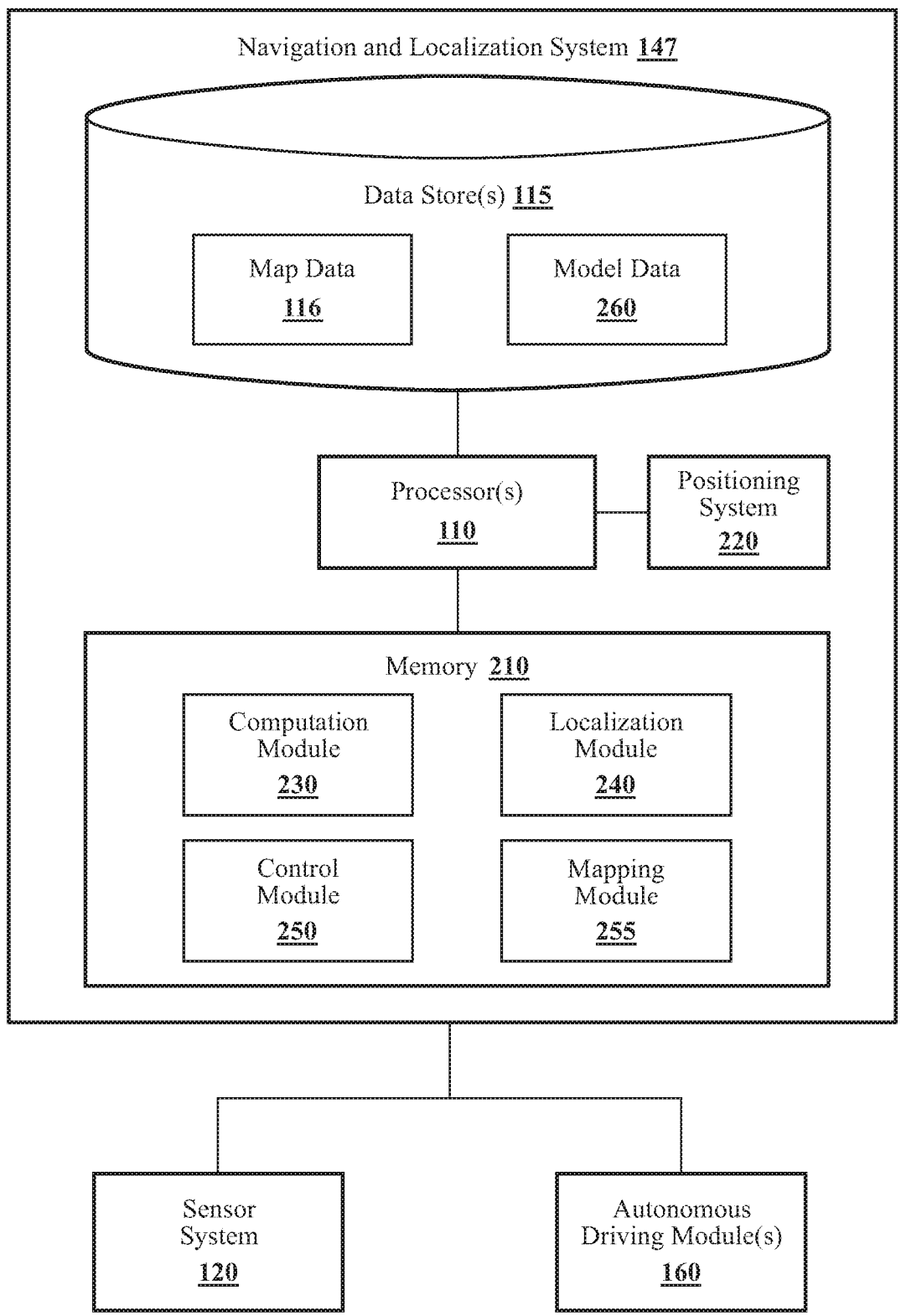
FIG. 2 illustrates one embodiment of a navigation and localization system.

With reference to FIG. 2, one embodiment of the navigation and localization system 147 of FIG. 1 is further illustrated. The navigation and localization system 147 is shown as including one or more processors 110 from the vehicle 100 of FIG. 1. Accordingly, the one or more processors 110 may be a part of the navigation and localization system 147, the navigation and localization system 147 may include one or more separate processors from the one or more processors 110 of the vehicle 100, or the navigation and localization system 147 may access the one or more processors 110 through a data bus or another communication path, depending on the embodiment.

Navigation and localization system 147 can include one or more devices, sensors, applications, and/or combinations thereof, now known or later developed, configured to determine the geographic location of the vehicle 100 and/or to determine a travel route for the vehicle 100. Other functions that navigation and localization system 147 performs in various embodiments are discussed in detail below. The navigation and localization system 147 can include a mapping module 255 to determine a travel route for the vehicle 100. The navigation and localization system 147 can also include a positioning system 220. Depending on the particular embodiment, positioning system 220 can be a global positioning system (GPS), a local positioning system, a geolocation system, or a combination of such systems.

In one embodiment, the navigation and localization system 147 includes a memory 210 that stores a computation module 230, a localization module 240, a control module 250, and a mapping module 255. The memory 210 is a random-access memory (RAM), read-only memory (ROM), a hard-disk drive, a flash memory, or other suitable memory for storing the modules 230, 240, 250 and 255. The modules 230, 240, 250 and 255 are, for example, computer-readable instructions that when executed by the one or more processors 110, cause the one or more processors 110 to perform the various functions disclosed herein.

In connection with performing navigation and localization functions for vehicle 100, navigation and localization system 147 can store various kinds of model data 260 in data stores 115. Model data 260 can include, for example, data associated with one or more variational neural networks (see the discussion of FIG. 3 below). Data stores 115 can also store map data 116 used by mapping module 255 and other modules in navigation and localization system 147, such as computation module 230, localization module 240, and control module 250.

As shown in FIG. 2, navigation and localization system 147 receives sensor data from sensor system 120. For example, in some embodiments, navigation and localization system 147 receives image data from one or more cameras 126 (e.g., front, right, and left cameras). Navigation and localization system 147 may also receive LIDAR data from LIDAR sensors 124, radar data from radar sensors 123, and/or sonar data from sonar sensors 125, depending on the particular embodiment. As also indicated in FIG. 2, navigation and localization system 147, in particular control module 250, can communicate with autonomous driving module(s) 160 to control aspects of vehicle systems 140 such as propulsion system 141, steering system 143, and braking system 142 when vehicle 100 is operating in an autonomous or semi-autonomous driving mode.

Computation module 230 generally includes instructions that cause the one or more processors 110 to perform functions pertaining to feature extraction and statistical analysis in support of navigation and localization. More specifically, in one embodiment, computation module 230 extracts perceptual features from the sensor data received from sensor system 120. Computation module 230 also extracts unrouted-map features from unrouted map data. Computation module 230 combines the extracted perceptual features and the extracted unrouted-map features to produce combined features data. Based at least in part on the combined features data, computation module 230 outputs the parameters of a probability distribution for one or more steering trajectories that are available to a vehicle. The vehicle in question can be an ego vehicle (e.g., vehicle 100), or it can be a road agent external to an ego vehicle.

In this description, the term "road agent" refers generally to any object that is capable of moving from place to place along or in a manner that intersects with a roadway. Such objects are not always necessarily in motion. In various embodiments, the road agents of interest are external to vehicle 100 (sometimes referred to herein as the "ego vehicle" or "host vehicle") in which an embodiment of the invention is installed and operating. Some examples of road agents include, without limitation, other vehicles of various types (automobiles, motorcycles, bicycles, trucks, construction equipment, etc.), pedestrians, and animals. A road agent external to an ego vehicle is sometimes referred to herein as an "external road agent."

In some embodiments, computation module 230 receives, as additional input, routed map data—map data in which a specific route to a destination is indicated. In those embodiments, computation module 230 extracts routed-map features from the routed map data. The extracted routed-map features are combined with the other extracted features (from the sensor data and the unrouted map data) so that they become part of the combined features data mentioned above.

Based at least in part on the combined features—data including features extracted from the sensor data, unrouted map data, and routed map data—computation module 230 outputs a deterministic steering control signal corresponding to a particular one of the one or more steering trajectories available to the vehicle, which, in the embodiments that include routed map data, is an ego vehicle (e.g., vehicle 100). Control module 250 can cause the one or more processors 110 to control the steering of vehicle 100 based, at least in part, on the deterministic control signal. For example, control module 250 can, via autonomous driving module(s) 160, cause vehicle 100 to drive autonomously a specified route consistent with the routed map data in accordance with the deterministic steering control signal.

In other embodiments, the one or more steering trajectories available to a vehicle pertain to an external road agent detected by an ego vehicle via its sensors rather than to the ego vehicle itself. In such embodiments, computation module 230 can, based at least in part on the parameters of the probability distribution, predict that the road agent will travel along a particular one of the one or more steering trajectories available to the road agent. The ego vehicle (vehicle 100) can then respond in accordance with the predicted trajectory of the external road agent, if necessary. The architecture and components of computation module 230 are described in greater detail in connection with FIGS. 3, 4A, 4B, and 5.

Figure 3:
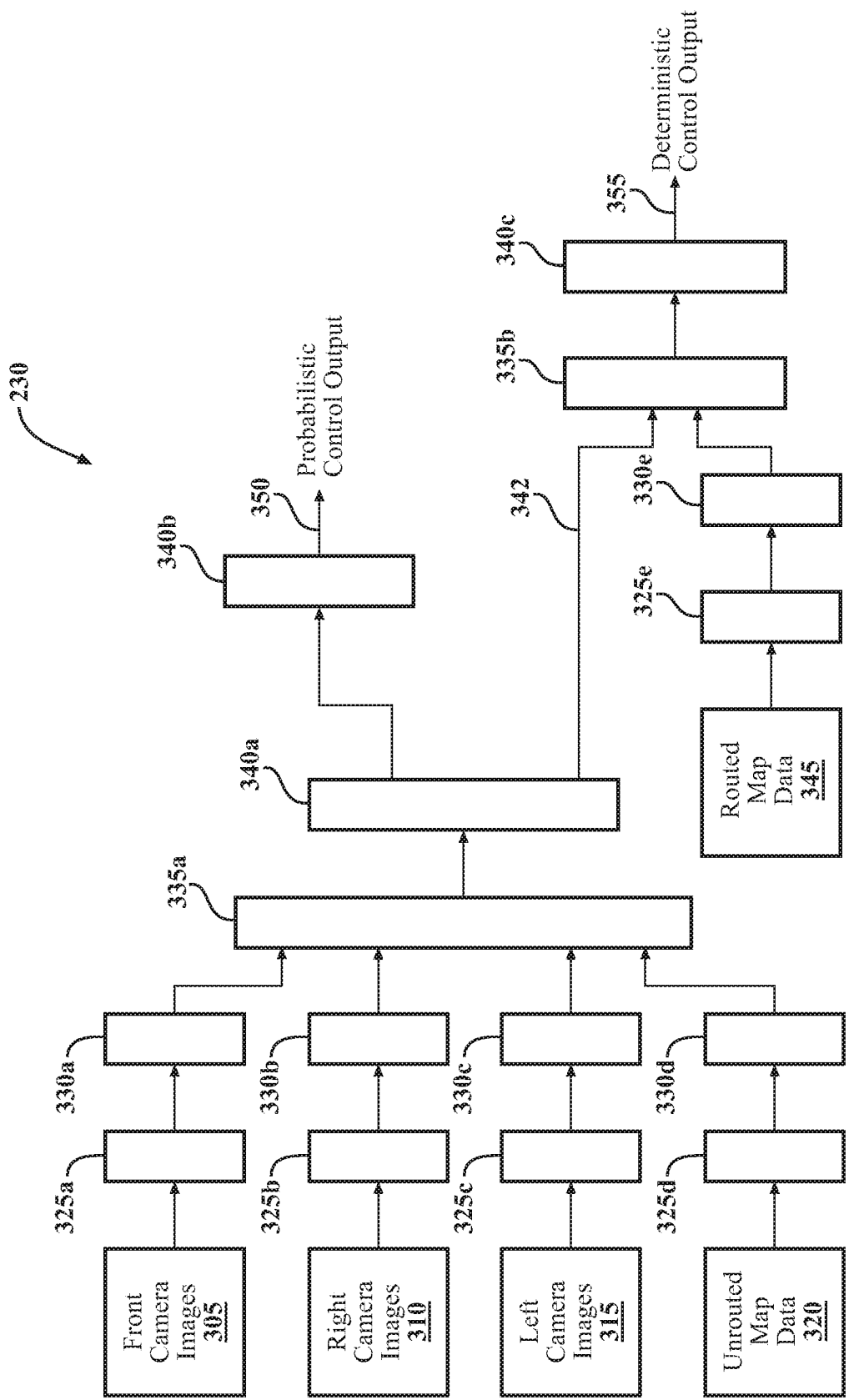
FIG. 3 illustrates one embodiment of a computation module in the navigation and localization system of FIG. 2.

FIG. 3 illustrates one embodiment of a computation module 230 in the navigation and localization system 147 of FIG. 2. In this particular embodiment, computation module 230 includes an end-to-end variational neural network that accepts, as input, front camera images 305, right camera images 310, left camera images 315, and unrouted map data 320. In some embodiments, image data from more than three cameras 126, fewer than three cameras 126, or only one camera 126 is input to the variational neural network. The front camera images 305, right camera images 310, left camera images 315, and unrouted map data 320 are processed by separate convolutional pipelines that include, respectively, convolutional layers 325a, 325b, 325c, and 325d. Each of these elements (325a, 325b, 325c, or 325d) can include one or more convolutional layers, depending on the particular embodiment. For simplicity, a single block for each is shown in FIG. 3. The outputs of the convolutional layers in the convolutional pipelines are fed, respectively, to flattening operation 330a, 330b, 330c, and 330d. Once flattened, the data in each pipeline is fed to concatenation operation 335a, in which the processed image data and the processed unrouted map data are concatenated together. The concatenated data is fed to one or more fully connected layers 340a (again, a single block is shown in FIG. 3 for simplicity). The output from a final fully connected layer 340b, probabilistic control output 350, can include the parameters of a probability distribution for one or more steering trajectories that are available to a vehicle.

As discussed above, in some embodiments, the variational neural network also receives, as input, routed map data 345. In some embodiments, the unrouted map data 320 is rendered as white roadways on a black canvas (background). The routed map data 345 corresponding to given unrouted map data 320 is rendered, in one embodiment, by adding a red channel to the canvas along the segments of the roadways included in the specified route. In general, the routed map data 345 includes an added indication of a specified route along certain roadways included in the map data. This indication of a specified route can correspond to a set of driving directions, in some embodiments. Routed map data 345 is processed by convolutional layers 325e (again, a single box is used in FIG. 3 to represent a possible plurality of such layers), flattened by flattening operation 330e, and concatenated, in concatenation operation 335b, with concatenated image and unrouted-map data 342. The output of concatenation operation 335b is fed to fully connected layer 340c to produce a deterministic control output 355 that control module 250 can use to steer vehicle 100 along the route specified in the routed map data 345. As explained above, control module 250 can do so via autonomous driving module(s) 160, which can control various vehicle systems 140 (see FIG. 1).

In some embodiments, the probability distribution for probabilistic control output 350 is a Gaussian Mixture Model (GMM) with K=3 modes to describe the possible steering control commands corresponding to the one or more available steering trajectories. The $L_{1/2}$ norm of the weights can be penalized to discourage extra components. In some embodiments, rather than using steering wheel angle for the steering control commands, the model learns a full, parametric probability distribution over inverse curvature. The parameters of the i-th component of the GMM are denoted by $(\phi_i, \mu_i, \sigma_i^2)$, where $\phi_i$ is the weight, $\mu_i$ is the mean, and $\sigma_i^2$ is the variance. The overall network can be expressed as two separate functions representing the stochastic (unrouted) and deterministic (routed) outputs, respectively:

$$\{(\phi_i,\mu_i,\sigma_i^2)\}_{i=1}^K = f_S(I, M_U, \theta_p), \quad (1)$$

$$\hat{\theta}_s = f_D(I, M_R, \theta_p), \quad (2)$$

where I denotes the image data (e.g., 305, 310, 315), $M_U$ denotes the unrouted map data 320, $M_R$ denotes the routed map data 345, $\theta_p = [p_x, p_y, p_\alpha]$ is the current pose in the map (position and heading), $f_S(I, M_U, \theta_p)$ is the probabilistic control output 350, and $\hat{\theta}_s = f_D(I, M_R, \theta_p)$ is the deterministic control output 355 (the "s" subscript of θ stands for "steering"). The training aspects of the model are discussed in a later portion of this description.

In some embodiments, a non-linear function known in the art as "rectified linear unit" (ReLU) is applied to the data between at least some of the layers of the variational neural network discussed above in connection with FIG. 3. Depending on the particular embodiment, other non-linear functions can be used instead of ReLU.

Figure 4A:
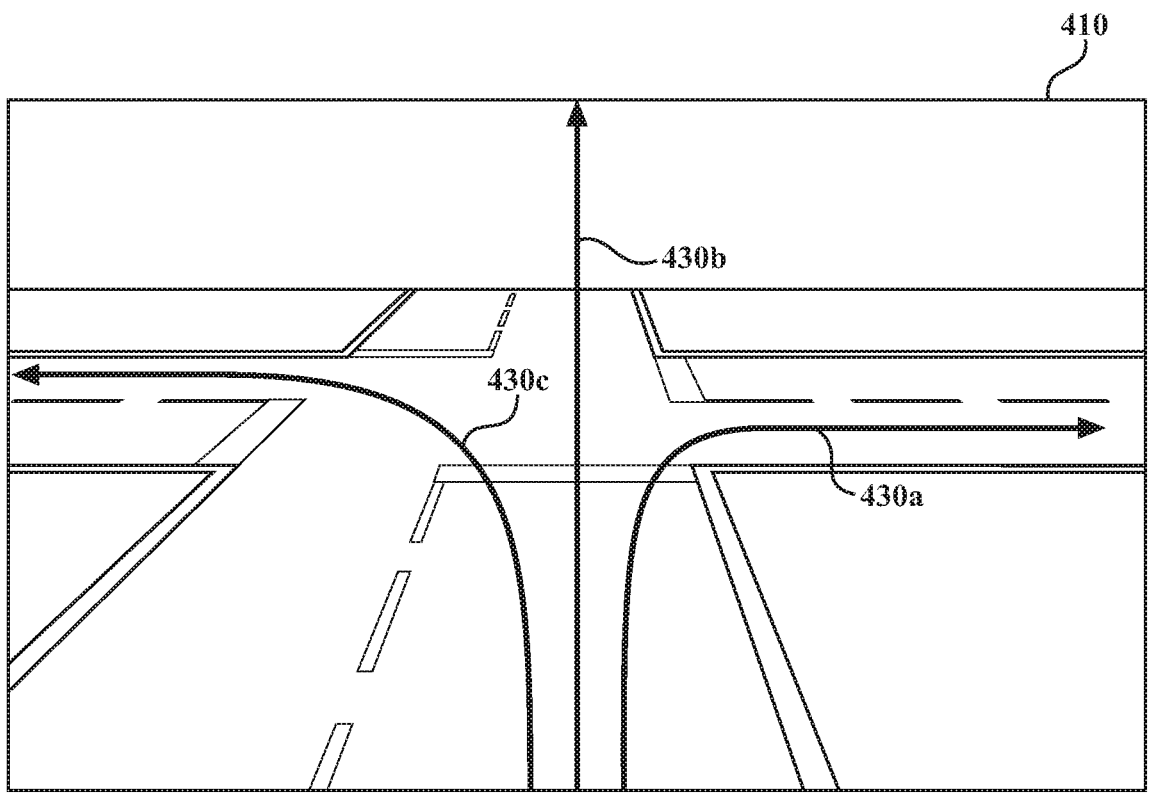
FIG. 4A illustrates an example of steering trajectories available to an ego vehicle at an intersection that are associated with a probabilistic control output from the computation module of FIG. 3, in accordance with an illustrative embodiment of the invention.

FIG. 4A illustrates an example of steering trajectories available to an ego vehicle at an intersection that are associated with a probabilistic control output 350 from the computation module 230 of FIG. 3, in accordance with an illustrative embodiment of the invention. The perspective-view sketch in FIG. 4A represents a front-camera scene 410 as the ego vehicle (e.g., vehicle 100) approaches the intersection. Three available trajectories available to the ego vehicle are marked in heavy lines as trajectory 430a (right turn), trajectory 430b (proceed straight), and trajectory 430c (left turn). In the embodiment discussed above in connection with FIG. 3, the probabilistic control output 350 includes parameters for a probability distribution (e.g., the GMM parameters) for the trajectories 430a, 430b, and 430c. In some embodiments, computation module 230 can predict that the ego vehicle will travel along a particular one of the available steering trajectories based, at least in part, on the parameters of the probability distribution (e.g., the GMM parameters). In some embodiments, control module 250 can control one or more vehicle systems 140 such as steering, braking, and/or acceleration in response to a predicted trajectory of the ego vehicle. This is useful in applications involving, for example, parallel autonomy, in which a human driver shares at least partial control of vehicle 100 with an autonomous driving system or advanced driver-assistance system (ADAS).

Figure 4B:
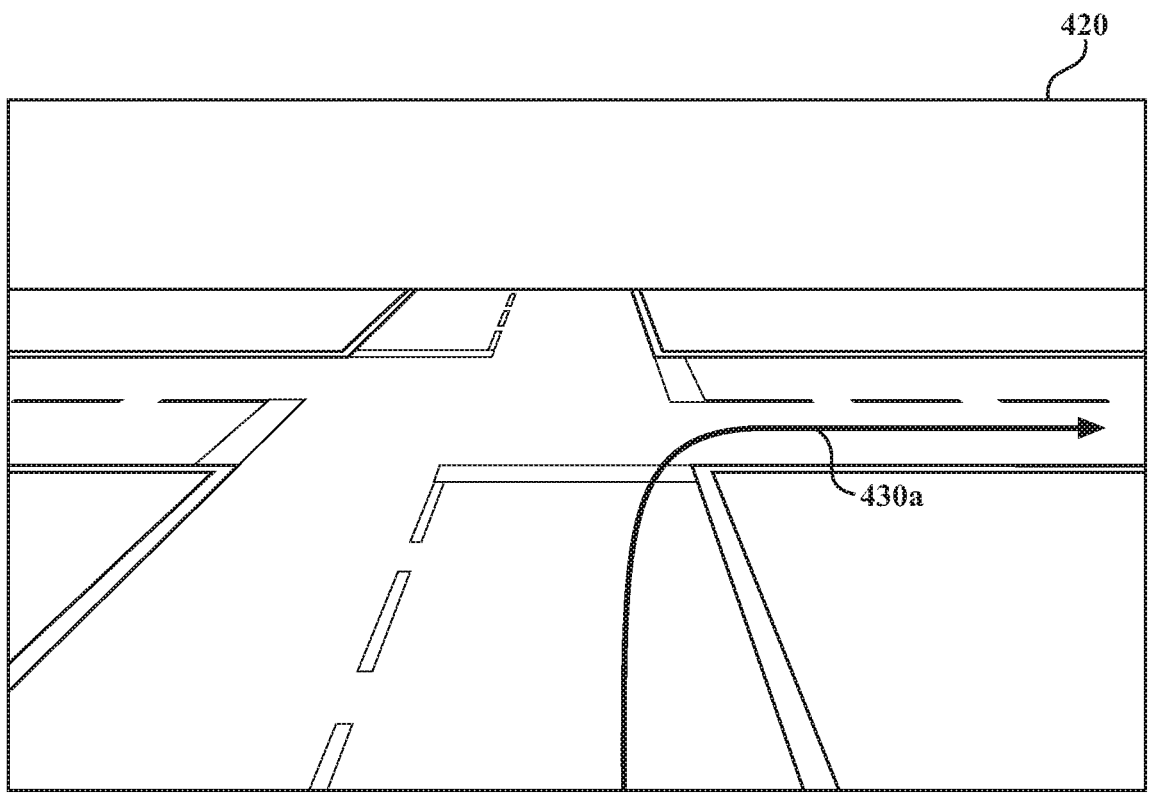
FIG. 4B illustrates an example of a particular steering trajectory for an ego vehicle at an intersection that is associated with a deterministic control output from the computation module of FIG. 3, in accordance with an illustrative embodiment of the invention.

FIG. 4B illustrates an example of a particular steering trajectory for an ego vehicle at an intersection that is associated with a deterministic control output 355 from the computation module 230 of FIG. 3, in accordance with an illustrative embodiment of the invention. As in FIG. 4A, the perspective-view sketch in FIG. 4B represents a front-camera scene 420 as the ego vehicle (e.g., vehicle 100) approaches the intersection. In the example of FIG. 4B, the variational neural network in computation module 230 has been supplied with routed map data 345 corresponding to the same map as unrouted map data 320. In this particular example, routed map data 345 specifies a right turn at the intersection. The resulting deterministic trajectory is marked in FIG. 4B as trajectory 430a. As explained above, control module 250 can use the deterministic control output 355 corresponding to this trajectory to steer vehicle 100 autonomously along the specified route.

Figure 5:
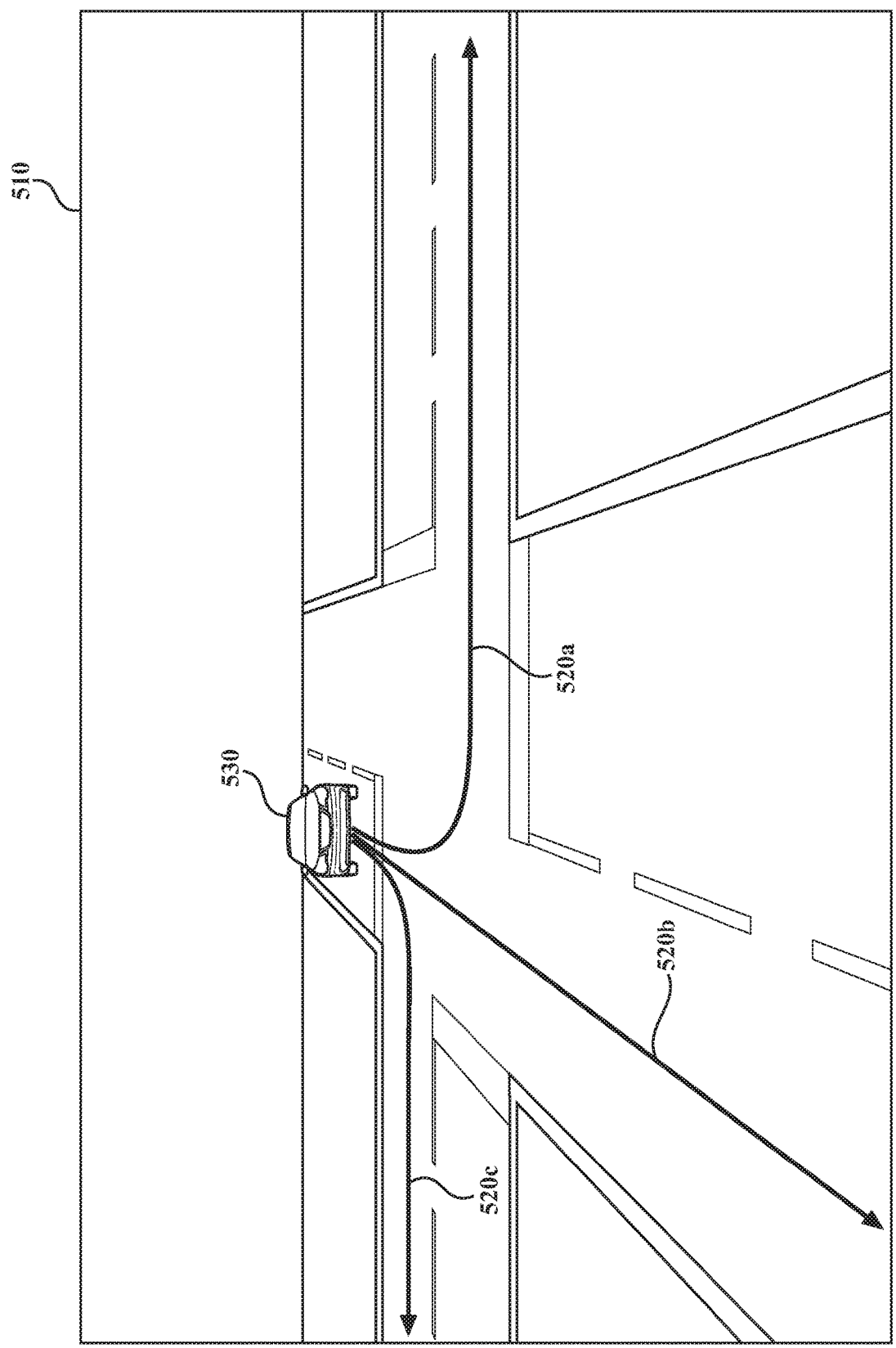
FIG. 5 illustrates an example of steering trajectories available to a road agent external to an ego vehicle at an intersection that are associated with a probabilistic control output from the computation module of FIG. 3, in accordance with an illustrative embodiment of the invention.

FIG. 5 illustrates an example of steering trajectories available to an external road agent at an intersection that are associated with the probabilistic control output 350 from the computation module 230 of FIG. 3, in accordance with an illustrative embodiment of the invention. In the example of FIG. 5, the perspective-view sketch in FIG. 5 represents a front-camera scene 510 as the ego vehicle (e.g., vehicle 100) approaches the intersection. Front-camera scene 510 includes an external road agent 530—another vehicle approaching the intersection from the opposite direction. Three possible trajectories available to external road agent 530 are marked with heavy lines as trajectory 520a (left turn), trajectory 520b (proceed straight), and trajectory 520c (right turn), where the trajectories are named from the perspective of external road agent 530. In the embodiment discussed above in connection with FIG. 3, the probabilistic control output 350 includes parameters for a probability distribution (e.g., the GMM parameters) for the trajectories 520a, 520b, and 520c. In some embodiments, computation module 230 can predict that the external road agent 530 will travel along a particular one of the available steering trajectories based, at least in part, on the parameters of the probability distribution, as discussed above. In some embodiments, control module 250 can control one or more vehicle systems 140 of vehicle 100 such as steering system 143 in response to the predicted trajectory of the external road agent 530.

Regarding the training of the variational neural network in computation module 230 (refer to FIG. 3), in one embodiment, the weights of the model are learned using backpropagation with the cost defined as follows:

$$\mathbb{E}\{\mathcal{L}_{(f_S(I,M,\theta_p),\theta_s)} + \|\phi\|_p + \Sigma_i \psi_S(\sigma_i) + (f_D(I,M,\theta_p)\theta_s)^2\}, \quad (3)$$

where $\psi_S$ is a per-component penalty on the standard deviation $\sigma_i$. In this embodiment, a quadratic term in log-σ is chosen for the regularization:

$$\psi_S(\sigma) = \|\log \sigma - c\|^2. \quad (4)$$

The term $\mathcal{L}(f_S(I, M, \theta_p), \theta_s)$ in Equation 3 is the negative log-likelihood of the steering command according to a GMM with parameters $\{(\phi_i, \mu_i, \sigma_i)\}_{i=0}^N$ and $P(\theta_s|\theta_p, I, M) = \Sigma \phi_i \mathcal{N}(\mu_i, \sigma_i^2)$.

Referring again to FIG. 2, localization module 240 generally includes instructions that cause the one or more processors 110 to perform a localization of a vehicle based, at least in part, on the parameters of the probability distribution output by computation module 230. As discussed above, the vehicle for which localization is performed can be vehicle 100 (an ego vehicle) or an external road agent 530 (e.g., another vehicle external to an ego vehicle). The conditional nature of the variational neural network of computation module 230 discussed in connection with FIG. 3 supports updating a posterior belief about a vehicle's pose based on the relationship between the map data and the road topology seen from an ego vehicle in which an embodiment of the invention is installed. Localization can be fine-grained or coarse-grained, as discussed above. First, fine-grained localization will be described and then coarse-grained localization.

In one embodiment, if the variational neural network of computation module 230 is provided with visual input (e.g., one or more camera images), I, which appears to have been captured at a four-way intersection, $P(\theta_p|I, M)$ can be computed over different poses with respect to the map to reason about where the image input could have been captured. In this embodiment, computation module 230 computes $P(\theta_s|\theta_p, I, M)$, but the conditioning structure of the model makes it possible to estimate a vehicle's pose given the visual input through double marginalization over $\theta_s$ and $\theta_p$. Given a prior belief about the pose, $P(\theta_p)$, the posterior belief after seeing the visual input I can be expressed as follows:

$$P(\theta_p \mid I, M) = \mathbb{E}_{\theta_s} P(\theta_p \mid \theta_s, I, M) \quad (5)$$

$$= \mathbb{E}_{\theta_s}\left[\frac{P(\theta_p, \theta_s \mid I, M)}{P(\theta_s \mid I, M)}\right]$$

$$= \mathbb{E}_{\theta_s}\left[\frac{P(\theta_p, \theta_s \mid I, M)}{\mathbb{E}_{\theta'_p} P(\theta_s \mid \theta'_p, I, M)}\right]$$

$$= \mathbb{E}_{\theta_s}\left[\frac{P(\theta_s \mid \theta_p, I, M)}{\mathbb{E}_{\theta'_p} P(\theta_s \mid \theta'_p, I, M)} P(\theta_p)\right],$$

where the equalities are due to the full probability theorem and Bayes' theorem, and $\theta'_p$ is a placeholder variable for the integral over poses.

Though marginalization over two random variables is traditionally inconvenient, in two cases of interest marginalizing over $\theta_p$ becomes easily tractable: (1) where the pose is highly localized due to previous observations, as in the case of on-line localization, and (2) where the pose is sampled over a discrete road network, as is done in map-matching algorithms. In one embodiment, the following algorithm is used to update posterior estimates of vehicle pose:

---

Input: I, M, $p(\theta_p)$
Output: $P(\theta_p|I, M)$
  for i = 1...$N_s$: do
    Sample $\theta_s$
    Compute $P(\theta_s|\theta_p, I, M)$
    for j = 1...$N_p$: do
      Compute $P(\theta_s|\theta'_p, I, M)$
      Aggregate $\mathbb{E}_{\theta'_p} P(\theta_s|\theta'_p, I, M)$
    end for Aggregate $\mathbb{E}_{\theta_s}\left[\frac{P(\theta_s|\theta_p, I, M)}{\mathbb{E}_{\theta'_p} P(\theta_s|\theta'_p, I, M)} P(\theta_p)\right]$ end for

---

Output $P(\theta_p|I, M)$ according to Equation 5.

As discussed above, this algorithm can be applied to the localization of an ego vehicle or an external road agent.

In some embodiments, localization module 240 uses the output of computation module 230 (e.g., probabilistic control output 350), at least in part, to distinguish a particular location in a set of locations from the other locations in the set of locations. This is an example of coarse-grained localization, in which navigation and localization system 147 distinguishes between significantly different locations (significantly separated spatially) without any prior information regarding the pose of the vehicle (an ego vehicle such as vehicle 100 or an external road agent 530).

In some embodiments, localization module 240 can detect that the localization of a vehicle (an ego vehicle 100 or an external road agent 530), the unrouted map data, or both is inconsistent with sensor data from sensor system 120 such as one or more images from camera(s) 126. In those embodiments, localization module 240 can correct the localization of the vehicle based, at least in part, on the parameters of the probability distribution output by computation module 230 (probabilistic control output 350). This ability to self-correct localization is one of the advantages of such an embodiment.

Referring again to FIG. 2, control module 250 generally includes instructions that cause the one or more processors 110 to perform functions pertaining to controlling vehicle 100 in response to the probabilistic control output 350 and/or the deterministic control output 355 of computation module 230. In one embodiment, control module 250 includes instructions that cause the one or more processors 110 to control the steering of vehicle 100 based, at least in part, on a deterministic steering control signal (deterministic control output 355). In doing so, control module 250 communicates with autonomous driving module(s) 160, which interface with various vehicle systems 140 such as steering system 143, propulsion system 141, and braking system 142 to drive vehicle 100 autonomously along the specified route corresponding to the deterministic control output 355. In some embodiments, control module 250 can also control various vehicle systems 140 as needed in response to a predicted trajectory of the ego vehicle or a predicted trajectory of an external road agent 530, as discussed above.

Figure 6:
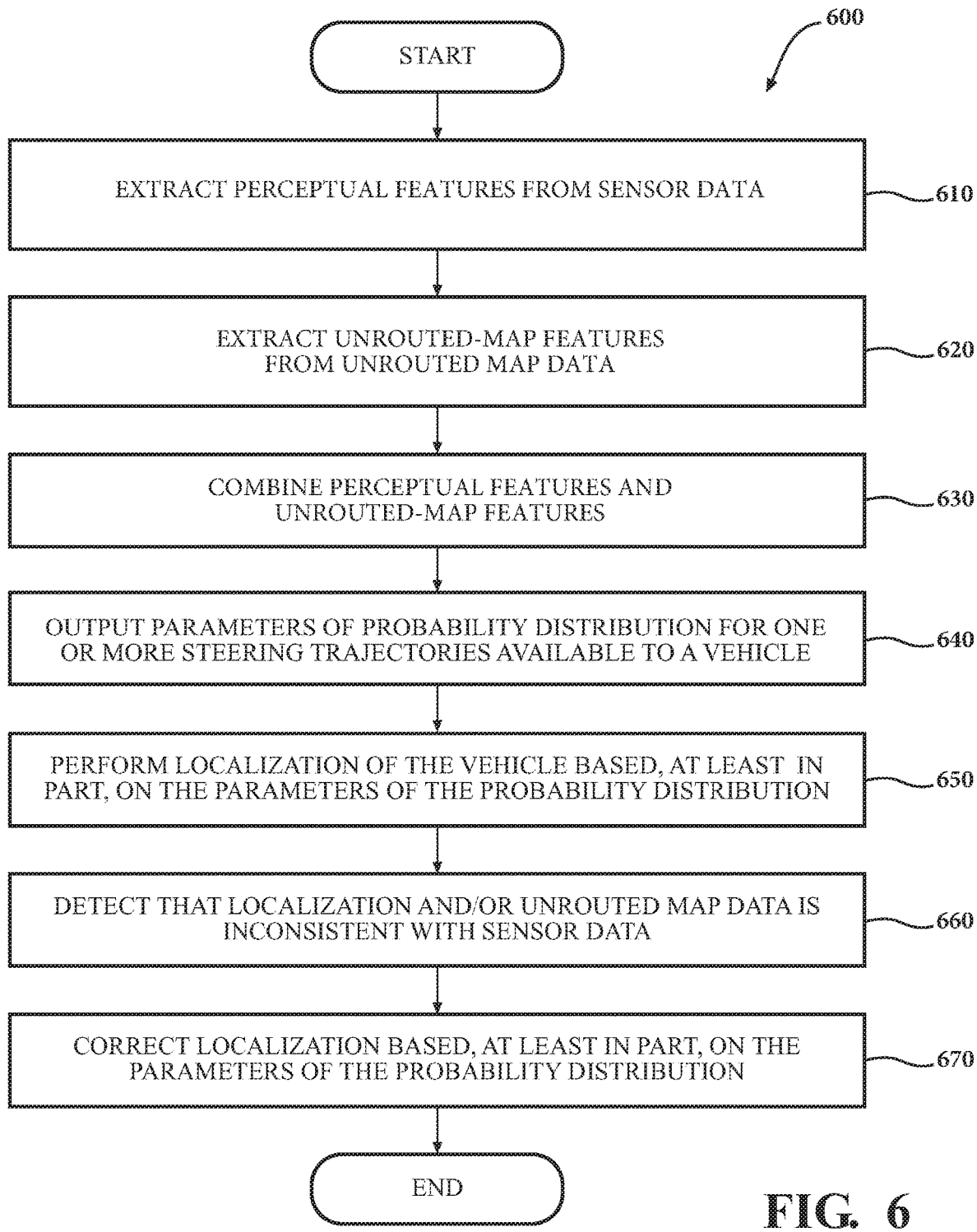
FIG. 6 is flowchart of a method of vehicular navigation and localization, in accordance with an illustrative embodiment of the invention.

FIG. 6 is a flowchart of a method 600 of vehicular navigation and localization, in accordance with an illustrative embodiment of the invention. Method 600 will be discussed from the perspective of navigation and localization system 147 in FIG. 2. While method 600 is discussed in combination with navigation and localization system 147, it should be appreciated that method 600 is not limited to being implemented within navigation and localization system 147, but navigation and localization system 147 is instead one example of a system that may implement method 600.

At block 610, computation module 230 extracts perceptual features from sensor data received from sensor system 120. As discussed above in connection with FIG. 3, in some embodiments, computation module 230 accomplishes this by processing, in a convolutional pipeline of a variational neural network, an image (e.g., 305, 310, or 315) from a camera 126 to generate processed image data.

At block 620, computation module 230 extracts unrouted-map features from unrouted map data. As discussed above in connection with FIG. 3, in some embodiments, computation module 230 accomplishes this by processing unrouted map data in another convolutional pipeline of the variational neural network to generate processed unrouted-map data.

At block 630, computation module 230 combines the perceptual features and the unrouted-map features to produce combined features data. As discussed above in connection with FIG. 3, in some embodiments, computation module 230 accomplishes this by concatenating the processed image data with the processed unrouted-map data to generate concatenated data.

At block 640, computation module 230 outputs, based at least in part on the combined features data, parameters of a probability distribution for one or more steering trajectories that are available to a vehicle. As discussed above in connection with FIG. 3, in some embodiments, computation module 230 provides the concatenated data to a set of one or more fully connected layers (e.g., 340a and 340b in FIG. 3) of the variational neural network. Computation module 230 outputs, from the set of one or more fully connected layers of the variational neural network, the parameters of a probability distribution (probabilistic control output 350) for one or more steering trajectories that are available to a vehicle (an ego vehicle 100 or an external road agent 530).

At block 650, localization module 240 performs a localization of the vehicle based, at least in part, on the parameters of the probability distribution (e.g., the parameters of a GMM). As discussed above, the localization can pertain to an ego vehicle 100 or to an external road agent 530, and the localization can be fine-grained or coarse-grained. An illustrative algorithm for performing posterior pose estimation for a vehicle is discussed above.

In some embodiments, the method terminates after block 650. In other embodiments, at block 660, localization module 240 detects that the localization of the vehicle, the unrouted map data, or both is inconsistent with sensor data from sensor system 120 (e.g., one or more camera images from camera(s) 126 that are input to computation module 230), as discussed above. At block 670, localization module 240 corrects the localization of the vehicle (vehicle 100 or an external road agent 530) based, at least in part, on the parameters of the probability distribution output by computation module 230 (e.g., probabilistic control output 350).

Figure 7:
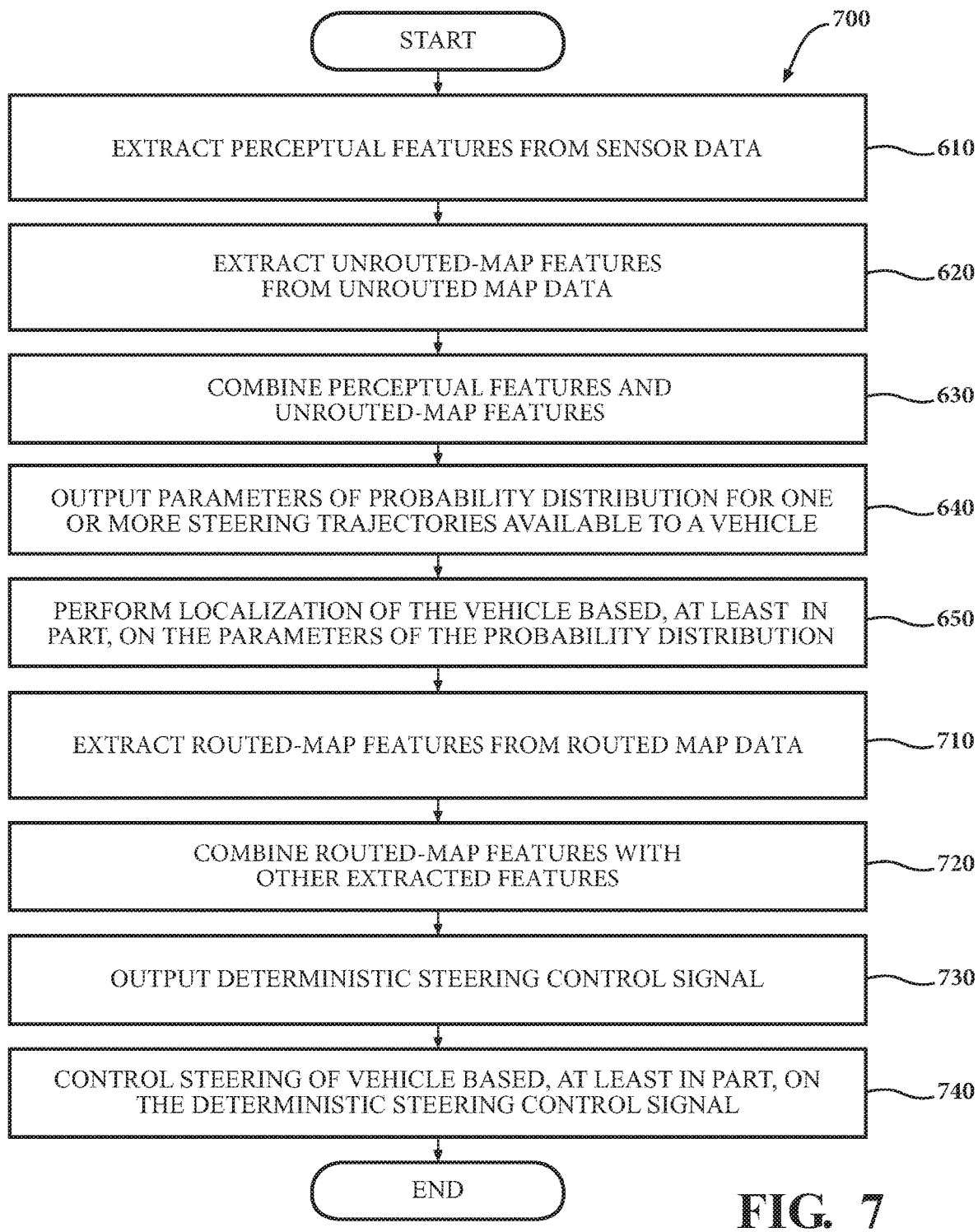
FIG. 7 is flowchart of a method of vehicular navigation and localization, in accordance with another illustrative embodiment of the invention.

FIG. 7 is a flowchart of a method 700 of vehicular navigation and localization, in accordance with an illustrative embodiment of the invention. Method 700 will be discussed from the perspective of navigation and localization system 147 in FIG. 2. While method 700 is discussed in combination with navigation and localization system 147, it should be appreciated that method 700 is not limited to being implemented within navigation and localization system 147, but navigation and localization system 147 is instead one example of a system that may implement method 700.

Blocks 610 through 650 proceed as discussed above in connection with method 600. At block 710, computation module 230 extracts routed-map features from routed map data. As discussed above in connection with FIG. 3, in some embodiments, computation module 230 processes routed map data in another convolutional pipeline of the variational neural network to generate processed routed-map data.

At block 720, computation module 230 combines the extracted routed-map features with the other extracted features (from the sensor data and the unrouted map data) so that the extracted routed-map features become part of the combined features data. As discussed above in connection with FIG. 3, in some embodiments, computation module 230 concatenates the processed routed-map data with the concatenated data generated in connection with block 630 (the "first concatenated data") to generate "second concatenated data."

At block 730, based at least in part on the combined features data (including the routed-map features), computation module 230 outputs a deterministic steering control signal corresponding to a particular one of the one or more steering trajectories. As discussed above in connection with FIG. 3, in some embodiments, computation module 230 provides the second concatenated data to another set of one or more fully connected layers (340c) of the variational neural network and outputs, from the other set of one or more fully connected layers, a deterministic steering control signal (e.g., deterministic control output 355) corresponding to a particular one of the one or more steering trajectories available to the vehicle.

At block 740, control module 250 controls the steering of the vehicle (ego vehicle 100) based, at least in part, on the deterministic steering control signal (e.g., deterministic control output 355). This permits vehicle 100 to be driven autonomously in accordance with the specified route corresponding to the deterministic steering control signal.

Figure 8:
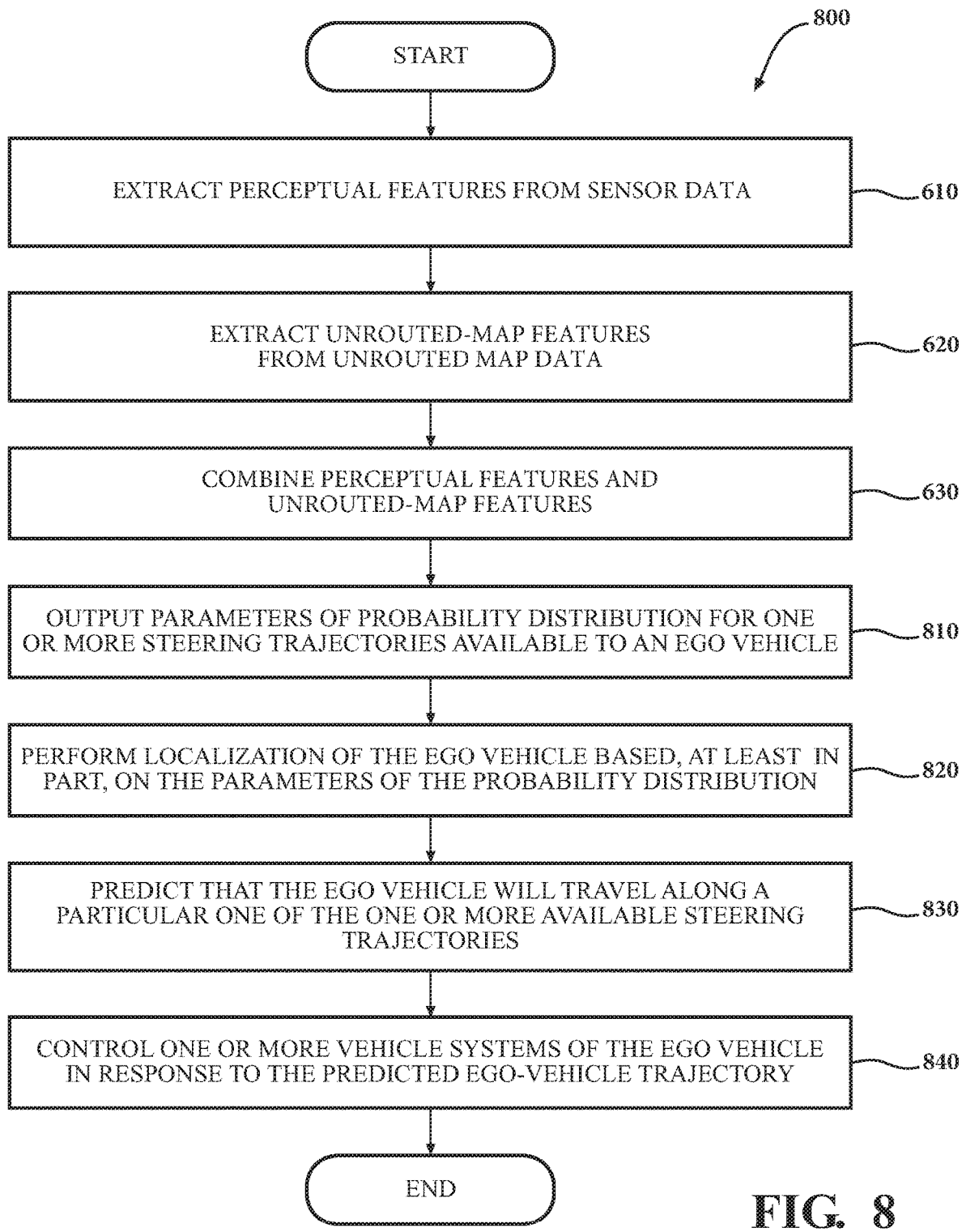
FIG. 8 is a flowchart of a method of vehicular navigation and localization, in accordance with another illustrative embodiment of the invention.

FIG. 8 is a flowchart of a method 800 of vehicular navigation and localization, in accordance with an illustrative embodiment of the invention. Method 800 will be discussed from the perspective of navigation and localization system 147 in FIG. 2. While method 800 is discussed in combination with navigation and localization system 147, it should be appreciated that method 800 is not limited to being implemented within navigation and localization system 147, but navigation and localization system 147 is instead one example of a system that may implement method 800.

Blocks 610 through 630 proceed as discussed above in connection with method 600. At block 810, computation module 230 outputs the parameters of a probability distribution for one or more steering trajectories that are available to an ego vehicle (e.g., vehicle 100). As discussed above in connection with FIG. 3, in some embodiments, computation module 230 outputs, from a set of one or more fully connected layers of a variational neural network (340a, 340b), the parameters of a probability distribution (probabilistic control output 350) for one or more steering trajectories that are available to an ego vehicle such as vehicle 100.

At block 820, localization module 240 performs a localization of the ego vehicle based, at least in part, on the parameters of the probability distribution. As discussed above in connection with FIG. 3, in some embodiments those parameters can include the parameters of a GMM.

At block 830, computation module 230 predicts that the ego vehicle will travel along a particular one of the one or more available steering trajectories based, at least in part, on the parameters of the probability distribution.

At block 840, control module 250 controls one or more vehicle systems 140 such as steering system 143 in response to the ego vehicle's predicted trajectory. As discussed above, such a prediction and automated response can be useful in the context of parallel-autonomy systems such as an advanced driver-assistance system (ADAS).

Figure 9:
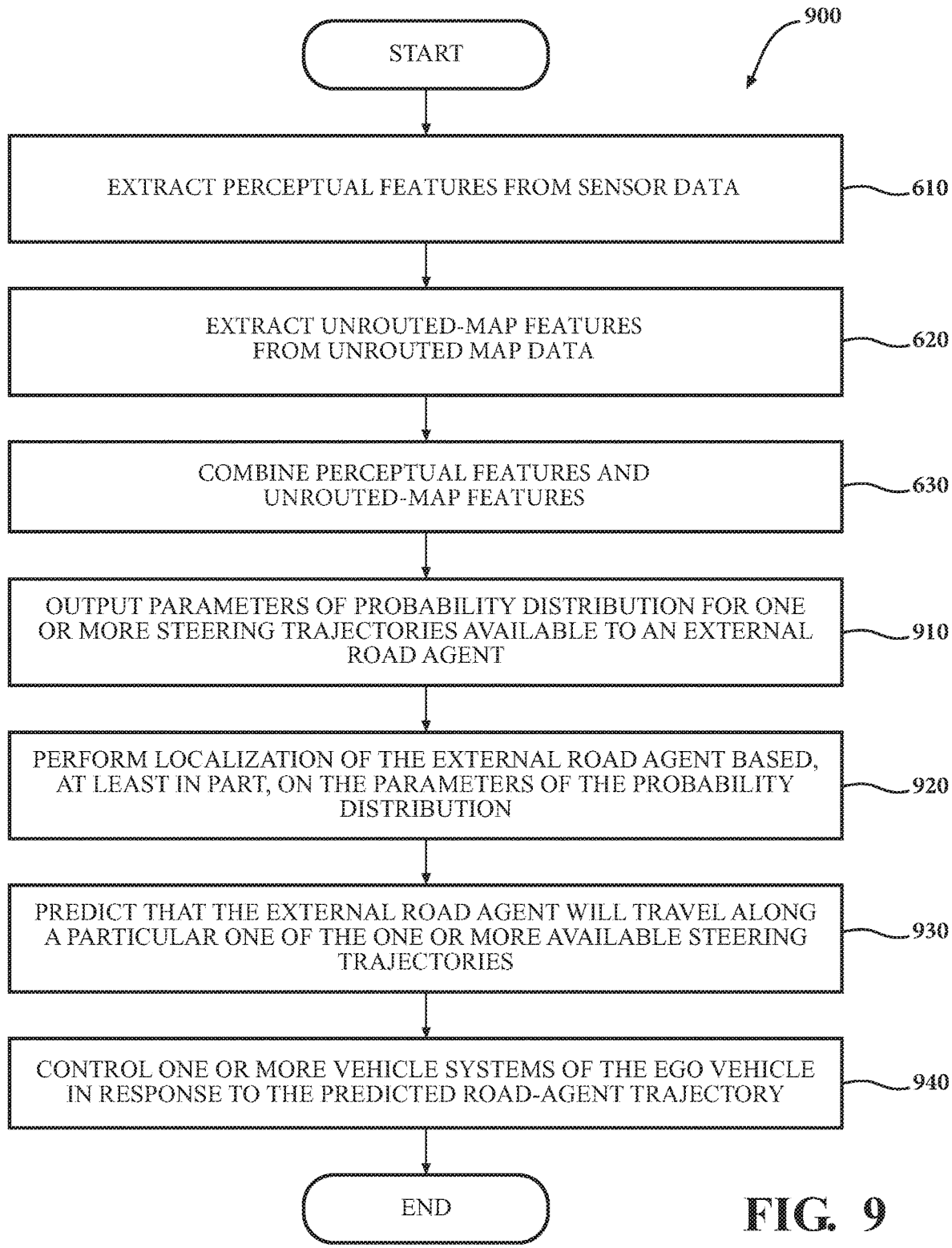
FIG. 9 is flowchart of a method of vehicular navigation and localization, in accordance with yet another illustrative embodiment of the invention.

FIG. 9 is a flowchart of a method 900 of vehicular navigation and localization, in accordance with an illustrative embodiment of the invention. Method 900 will be discussed from the perspective of navigation and localization system 147 in FIG. 2. While method 900 is discussed in combination with navigation and localization system 147, it should be appreciated that method 900 is not limited to being implemented within navigation and localization system 147, but navigation and localization system 147 is instead one example of a system that may implement method 900.

Blocks 610 through 630 proceed as discussed above in connection with method 600. At block 910, computation module 230 outputs the parameters of a probability distribution for one or more steering trajectories that are available to an external road agent. As discussed above in connection with FIG. 3, in some embodiments, computation module 230 outputs, from the set of one or more fully connected layers of a variational neural network, the parameters of a probability distribution (probabilistic control output 350) for one or more steering trajectories that are available to an external road agent 530.

At block 920, localization module 240 performs a localization of the external road agent 530 based, at least in part, on the parameters of the probability distribution. As discussed above in connection with FIG. 3, in some embodiments those parameters can include the parameters of a GMM.

At block 930, computation module 230 predicts that the external road agent 530 will travel along a particular one of the one or more available steering trajectories based, at least in part, on the parameters of the probability distribution.

At block 940, control module 250 controls one or more vehicle systems 140 of vehicle 100 such as steering system 143 in response to the predicted trajectory of the external road agent 530.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation and localization system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation and localization system 147. Each of these systems can include one or more devices, components, and/or combination thereof, now known or later developed.

The processor(s) 110, the navigation and localization system 147, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the navigation and localization system 147, and/or the autonomous driving module(s) 160 may control some or all of these vehicle systems 140 and, thus, may be partially or fully autonomous.

The processor(s) 110, the navigation and localization system 147, and/or the autonomous driving module(s) 160 can be operably connected to communicate with the various vehicle systems 140 and/or individual components thereof. For example, returning to FIG. 1, the processor(s) 110, the navigation and localization system 147, and/or the autonomous driving module(s) 160 can be in communication to send and/or receive information from the various vehicle systems 140 to control the movement, speed, maneuvering, heading, direction, etc. of the vehicle 100. The processor(s) 110, the navigation and localization system 147, and/or the autonomous driving module(s) 160 may control some or all of these vehicle systems 140.

The processor(s) 110, the navigation and localization system 147, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the navigation and localization system 147, and/or the autonomous driving module(s) 160 can control the direction and/or speed of the vehicle 100. The processor(s) 110, the navigation and localization system 147, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the navigation and localization system 147 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for vehicular navigation and localization, the system comprising:
   one or more sensors to output sensor data;
   one or more processors; and
   a memory communicably coupled to the one or more processors and storing:
   a computation module including instructions that when executed by the one or more processors cause the one or more processors to:
     extract perceptual features from the sensor data;
     extract unrouted-map features from unrouted map data;
     combine the perceptual features and the unrouted-map features to produce first combined features data;
     output, based at least in part on the first combined features data, parameters of a probability distribution for one or more steering trajectories that are available to a vehicle;
     extract routed-map features from routed map data;
     combine the routed-map features with the first combined features data to produce second combined features data; and
     output, based at least in part on the second combined features data, a deterministic steering control signal corresponding to a particular one of the one or more steering trajectories;
   a control module including instructions that when executed by the one or more processors cause the one or more processors to control steering of the vehicle based, at least in part, on the deterministic steering control signal; and
   a localization module including instructions that when executed by the one or more processors cause the one or more processors to perform a localization of the vehicle based, at least in part, on the parameters of the probability distribution and an updated posterior estimate of a pose of the vehicle, wherein computing the updated posterior estimate of the pose of the vehicle includes performing double marginalization over the deterministic steering control signal and the pose of the vehicle.

2. The system of claim 1, wherein the vehicle is an ego vehicle and the computation module includes further instructions that when executed by the one or more processors cause the one or more processors to:
predict that the ego vehicle will travel along a particular one of the one or more steering trajectories based, at least in part, on the parameters of the probability distribution; and
control one or more vehicle systems of the ego vehicle in response to the particular one of the one or more steering trajectories.

3. The system of claim 1, wherein the vehicle is a road agent external to an ego vehicle and the computation module includes further instructions that when executed by the one or more processors cause the one or more processors to:
predict that the road agent will travel along a particular one of the one or more steering trajectories based, at least in part, on the parameters of the probability distribution; and
control one or more vehicle systems of the ego vehicle in response to the particular one of the one or more steering trajectories.

4. The system of claim 1, wherein the localization module includes instructions to perform the localization of the vehicle by distinguishing a particular location in a set of locations from the other locations in the set of locations based, at least in part, on the parameters of the probability distribution.

5. The system of claim 1, wherein the probability distribution is for a steering control command over inverse curvature conditioned on the perceptual features and the unrouted-map features.

6. The system of claim 5, wherein the probability distribution is a Gaussian Mixture Model.

7. The system of claim 1, wherein the localization module includes further instructions to:
detect that at least one of the localization of the vehicle and the unrouted map data is inconsistent with the sensor data; and
correct the localization of the vehicle based, at least in part, on the parameters of the probability distribution.

8. A non-transitory computer-readable medium for vehicular navigation and localization and storing instructions that when executed by one or more processors cause the one or more processors to:
extract perceptual features from sensor data;
extract unrouted-map features from unrouted map data;
combine the perceptual features and the unrouted-map features to produce first combined features data;
output, based at least in part on the first combined features data, parameters of a probability distribution for one or more steering trajectories that are available to a vehicle;
extract routed-map features from routed map data;
combine the routed-map features with the first combined features data to produce second combined features data;
output, based at least in part on the second combined features data, a deterministic steering control signal corresponding to a particular one of the one or more steering trajectories;
control steering of the vehicle based, at least in part, on the deterministic steering control signal; and perform a localization of the vehicle based, at least in part, on the parameters of the probability distribution and an updated posterior estimate of a pose of the vehicle, wherein computing the updated posterior estimate of the pose of the vehicle includes performing double marginalization over the deterministic steering control signal and the pose of the vehicle.

9. A method of vehicular navigation and localization, the method comprising:
extracting perceptual features from sensor data;
extracting unrouted-map features from unrouted map data;
combining the perceptual features and the unrouted-map features to produce first combined features data;
outputting, based at least in part on the first combined features data, parameters of a probability distribution for one or more steering trajectories that are available to a vehicle;
extracting routed-map features from routed map data;
combining the routed-map features with the first combined features data to produce second combined features data;
outputting, based at least in part on the second combined features data, a deterministic steering control signal corresponding to a particular one of the one or more steering trajectories;
controlling steering of the vehicle based, at least in part, on the deterministic steering control signal; and
performing a localization of the vehicle based, at least in part, on the parameters of the probability distribution and an updated posterior estimate of a pose of the vehicle, wherein computing the updated posterior estimate of the pose of the vehicle includes performing double marginalization over the deterministic steering control signal and the pose of the vehicle.

10. The method of claim 9, wherein the vehicle is an ego vehicle and the method further comprises:
predicting that the ego vehicle will travel along a particular one of the one or more steering trajectories based, at least in part, on the parameters of the probability distribution; and
controlling one or more vehicle systems of the ego vehicle in response to the particular one of the one or more steering trajectories.

11. The method of claim 9, wherein the vehicle is a road agent external to an ego vehicle and the method further comprises:
predicting that the road agent will travel along a particular one of the one or more steering trajectories based, at least in part, on the parameters of the probability distribution; and
controlling one or more vehicle systems of the ego vehicle in response to the particular one of the one or more steering trajectories.

12. The method of claim 9, wherein performing the localization of the vehicle includes distinguishing a particular location in a set of locations from the other locations in the set of locations based, at least in part, on the parameters of the probability distribution.

13. The method of claim 9, further comprising:
detecting that at least one of the localization of the vehicle and the unrouted map data is inconsistent with the sensor data; and
correcting the localization of the vehicle based, at least in part, on the parameters of the probability distribution.

* * * * *